US011899041B2

(12) United States Patent
Malovichko et al.

(10) Patent No.: US 11,899,041 B2
(45) Date of Patent: Feb. 13, 2024

(54) METHOD FOR REFERENCING A NEAR-FIELD MEASUREMENT WITH DRIFT AND FLUCTUATION CORRECTION

(71) Applicant: ATTOCUBE SYSTEMS AG, Haar (DE)

(72) Inventors: Ivan Malovichko, Haar (DE); Florian Huth, Haar (DE); Alexander A. Govyadinov, Haar (DE); Marcus Diem, Haar (DE)

(73) Assignee: ATTOCUBE SYSTEMS AG, Haar (DE)

( * ) Notice: Subject to any disclaimer, the term of this patent is extended or adjusted under 35 U.S.C. 154(b) by 0 days.

(21) Appl. No.: 18/016,638

(22) PCT Filed: Jul. 16, 2021

(86) PCT No.: PCT/EP2021/069983
§ 371 (c)(1),
(2) Date: Jan. 17, 2023

(87) PCT Pub. No.: WO2022/013431
PCT Pub. Date: Jan. 20, 2022

(65) Prior Publication Data
US 2023/0280369 A1    Sep. 7, 2023

(30) Foreign Application Priority Data

Jul. 17, 2020  (EP) .................................. 20186521

(51) Int. Cl.
*G01Q 60/22*  (2010.01)
*G01Q 30/04*  (2010.01)

(52) U.S. Cl.
CPC ............. *G01Q 60/22* (2013.01); *G01Q 30/04* (2013.01)

(58) Field of Classification Search
CPC .............................. G01Q 60/22; G01Q 30/04
See application file for complete search history.

(56) References Cited

U.S. PATENT DOCUMENTS

2017/0219622 A1* 8/2017 Yang ..................... G01Q 60/22

* cited by examiner

Primary Examiner — Tony Ko
(74) Attorney, Agent, or Firm — ADRIANO & ASSOCIATES

(57) ABSTRACT

The present invention relates to a method for referencing a near-field measurement, e.g. in a scanning probe microscope.

16 Claims, 11 Drawing Sheets

(a)

METHOD FOR REFERENCING A NEAR-FIELD MEASUREMENT WITH DRIFT AND FLUCTUATION CORRECTION

This subject application claims priority under 35 U.S.C. § 371 to PCT Application No. PCT/EP2021/069983, filed Jul. 16, 2021, which claims the benefit of European Patent Application 20186521.9, filed Jul. 17, 2020. The contents of these applications are incorporated by reference in their entireties here.

The present invention relates to a method for referencing a near-field measurement, e.g. in a scanning probe microscope.

BACKGROUND OF THE INVENTION

Infrared (IR) spectroscopy and microscopy are powerful analytical tools utilized in many disciplines such as materials and life sciences. IR spectroscopy collects IR spectra of studied materials and is able in many cases to identify the chemical composition of an unknown sample according to acquired spectral signatures that are unique to specific materials or chemical bonds. IR spectroscopy is normally performed on bulk samples and yields no spatially-resolved information. Infrared microscopy collects spatially-resolved images of a sample at a selected illumination wavelength and is capable of differentiating and spatially mapping the sample constituents. However, due to the diffraction limit the resolution of conventional IR spectroscopy and microscopy is on the wavelength scale, i.e. micrometer or higher. It is highly beneficial to perform IR microscopy and spectroscopy on a highly-localized scale down to tens of nanometers to provide nanoscale-resolved information on the sample composition, such as location of different materials, complexes and molecular structures.

Scattering-type scanning near-field optical microscopy (s-SNOM) is one of the techniques that allows for performing IR spectroscopy and microscopy at the nanometer scale. s-SNOM setup typically comprises an illumination source, an asymmetric interferometer and an atomic force microscope (AFM) placed into one of the interferometer arms (see FIG. 1). The interferometer splits the light from the illumination source into two arms—the sample and the reference—and recombines them at the detector. The light in the sample arm is focused onto the AFM tip and the scattering from this tip is collected and guided towards a detector. The illuminated AFM tip acts as an antenna that receives the incoming light and channels it towards the tip apex, creating a strong near-field hotspot confined to the size on the scale of the tip apex radius. When a sample is placed into this hotspot, the tip interacts with the sample via near fields in the hotspot. This interaction depends on the local dielectric properties of the sample and alters the tip scattering, thus delivering the information on the sample properties from the near field to the far-field detector. Interferometric detection provides a strong boost to the weak tip scattering and, importantly, allows for measuring both amplitude and phase of the scattered light.

s-SNOM measurements could be performed by using broadband light sources, such as a femtosecond-pulsed lasers, synchrotrons or glowbars, which deliver radiation in a broad frequency spectrum. Using broadband sources allows for performing a local spectroscopy, i.e. recording the whole spectral response of the material using e.g. a technique known as nano-FTIR (see Huth et al., 2012). Alternatively, s-SNOM can utilize narrowband sources, which deliver constant wavelength (CW) or a relatively narrowband radiation. Such sources are utilized for recording an image by scanning a region of interest with the AFM tip. Particularly, when a narrowband source is wavelength-tunable, one can record a spectrum at each point of interest by "sweeping" through the source's frequency tuning range (point spectroscopy).

Scattering from the AFM tip has two contributions: near-field, $E_{nf}$, and the background $E_{bg}$. The near-field contains local information from the near-field hotspot. The background originates from everything that fall into the illumination beam focus and, due to its large size (the beam focus diameter is on the scale of 10 micrometers for mid-IR frequencies) is delocalized (i.e. is not collected from the nanoscale area below the tip apex) and dominant over the near-field contribution. In order to extract the local near-field contribution the background needs to be suppressed. One way of removing the background is based on the extrapolation of the background into the near-field zone using a general model for the background and the subsequent complex-value subtraction of the extrapolated signal from the total signal, as also described in EP2800977, which is included herein by reference.

An alternative widely utilized method for the background suppression utilizes the high-harmonic demodulation technique. According to this technique, the AFM is operated in tapping mode, in which the tip-sample distance is modulated harmonically at a frequency $\Omega \sim 100$ kHz and the detector signal is demodulated at one (or several) harmonics $n\Omega$ of this frequency (n is an integer). The background is nearly linear in tip-sample distance thus contributes primarily to the lower harmonics (n=0 and n=1). On the contrary, the near-field interaction is highly nonlinear in the tip-sample distance and contributes to all lower and higher harmonics. It is customary in the art to select a particular harmonic, typically $n \geq 2$, where the background is suppressed to a desired level and use it as a measure of the near-field interaction (see Ocelic, 2007).

Optical detectors do not measure the scattered field (E) but its intensity ($I \sim |E|^2$), which results in the appearance of a multiplicative of background. The multiplicative background is manifested as a multiplicative contribution in the detector signal of the form $E_{bg}E_{nf}$ and is not suppressed by the high-harmonic demodulation technique. It is one of the major reasons preventing the utilization of detection techniques in s-SNOM, which do not utilize the interferometer but directly measure the scattered signal, such as self-homodyne (Craig et al., 2013; Ocelic, 2007). Such techniques are called non-interferometric, however due to the unpredictable multiplicative background these techniques are unable to deliver pure near-field signal and are rarely utilized in s-SNOM.

In order to suppress the multiplicative background, in modern s-SNOM interferometric detection is utilized (in addition to the high-harmonic demodulation) as depicted in FIG. 1, which relies on the modulation (in a harmonic or linear fashion) of the interferometer reference arm length and discarding the signal that is unaffected by this modulation. Several relevant techniques are known in the art, namely Pseudoheterodyne (PsHet), nano-FTIR and High Speed Holography (HSH). PsHet and nano-FTIR are described in EP1770714, and HSH is described in EP2951647, the content of which is incorporated by reference herein. These techniques provide complete background suppression and also allow for measuring the phase of the scattered light with respect to the phase of reference beam. Since the reference phase is generally unknown, a typical measurement procedure requires two steps: In the first step, the detector reading is measured at the sample position of interest A and, in the second step, the detector reading is measured on some known material as the position B, which serves as a reference measurement. The measurement at A is then normalized to the reference measurement at B (see FIG. 2). This normalization cancels the unknown measurement (transfer) function of the microscope and, particularly, the reference beam phase, assuming that it does not change between measurement A and B.

The need for the reference measurement presents a significant limitation for the point spectroscopy using wavelength-tunable illumination sources. Indeed, upon tuning the illumination source, the reference beam properties (both phase and amplitude) could change unpredictably. This in turn requires measuring the sample and the reference sequentially before tuning the source to the next illumination wavelength (see FIG. 2), which in turn requires moving the AFM tip back and forth between the sample and reference areas multiple times. This leads to extremely long measurement times, when the sample and the reference areas are located far from each other, and even render the point spectroscopy impossible when the reference area is not located on the same sample.

The problem of unpredictable changes in the reference beam upon tuning the illumination sources is known and discussed in the art (e.g. Yoxall, Schnell, Mastel, & Hillenbrand, 2015) and has been partially addressed in WO2016146481A1, the content of which is included herein by reference. This document teaches that the optical pathlengths in two interferometer arms should be kept the same, i.e. in a so-called white light position (WLP). Setting interferometer to the WLP prevents large unpredictable changes in the reference beam phase occurring upon small changes in the illumination wavelength, thus enabling one to sweep through the laser tuning range at the sample area before moving the tip to the reference area (see FIG. 3). However, such an approach still requires performing a reference measurement, which is a significant limitation on the speed of point spectroscopy.

All interferometric measurements with s-SNOM are sensitive to unavoidable mismatch between the reference and sample optical path lengths due to finite accuracy in determining lengths and different parasitical physical-effects, such as dispersion, thermal drifts, mechanical noises, convectional airflow and water vapor fluctuations. Such physical effects limit stability of optical-phase between the reference and sample arms and are known in the art as a major limitation of the accuracy of any interferometric detection system. This most importantly limits the sensitivity and accuracy of s-SNOM spectroscopies with both narrowband and broadband sources.

Some of such parasitical physical-effects not changing their contribution from measurement to measurement, such as inaccuracy in defining lengths or slightly-different dispersion properties in the reference and sample arms, could be compensated by normalization to the reference measurement (see e.g. US201715488240A1 or US2017219622A1).

Alternatively, US2018203039A1 teaches to correct by applying a look-up table. To retrieve such a look-up table, an additional mirror or several mirrors are introduced into the sample arm prior to s-SNOM measurements in order to characterize the dispersion of the interferometer. However, these approach has little relevance in practice, since it is practically impossible to achieve a long-term sub-wavelength stability of the interferometer required for the utilization of such premeasured look-up table (for example everyday routine such as probe-exchange procedure unavoidably introduces changes of the order of few wavelengths in the sample arm).

In addition to the constant parasitical effects, all interferometric methods known in art, e.g. as cited above, suffer from parasitical physical effects that are changing their contribution in time—such as thermal drifts, mechanical noises and air fluctuations.

A special interferometer design was proposed in US2016003868A1 to minimize the negative influence of such parasitical physical effects is that the reference arm is partially overlapped with the sample arm. Such design allows for a partial compensation of the phase-delays through the shared beam path segment. Nevertheless, besides the shared beam path in such design, there is still at least one large uncompensated segment of the sample beam path between the focusing mirror and the tip. Practically, this segment could not be much shorter than the focal length of the parabolic mirror and thus still significantly limits measurement accuracy.

In addition, none of the methods described in the art proposes any compensation for light source power-fluctuations or for possible variations of the focused light intensity within the probe-sample interaction region (such parasitic light intensity variations emerge due to the effects located in close vicinity to the probe—such as interference of the focused light with sample surface that results to "indirect illumination" effect, see Ocelic, 2007).

The problem addressed in the present application is therefore the provision of a method for referencing a near-field measurement, e.g. in a scanning probe microscope, which does not show the above described drawbacks of the prior art methods, and in particular avoids the need for a separate reference measurement.

BRIEF SUMMARY OF THE INVENTION

The present invention relates to a method for referencing a near-field measurement of a sample in a scattering type near field microscope comprising a probe and a sample, which method comprises the steps of a) providing a modulation of the probe-sample distance $z(t)=z_0-A*\cos(\varphi(t))$ having an offset distance $z_0$, phase $\varphi(t)$, such that $\varphi(t)=0$ corresponds to the smallest probe-sample distance, and a modulation frequency $$\Omega = \frac{d\varphi(t)}{dt};$$

b) measuring the scattering signal S of the probe, and determining $\sigma_n$ for different n as the scattering signal S demodulated at frequencies $n*\Omega$, n being an integer equal to or larger than 0, wherein $\sigma_n$ is determined for at least M different frequencies $n*\Omega$, and M being at least 2;

c) calculating a reference background $\sigma_{rbg}$ as a linear combination of $\sigma_n$ according to equation (II)

$$\sigma_{rbg} = \Sigma_n A_n * \sigma_n \quad (II)$$

wherein coefficients $A_n$ of the respective frequencies $n*\Omega$ are to be chosen such that the relative contribution of the scattering signal for $|\varphi(t)|<\varepsilon$, wherein $\varepsilon \leq \pi$, to the $\sigma_{rbg}$ is made small over an oscillation cycle ($|\varphi(t)| \leq \pi$);

d) determining the near-field signal aw of a position of the sample using at least one harmonic of the modulation frequency Ω at a frequency m*Ω, m being an integer equal to or larger than 0, and e) determining the referenced near-field signal $\sigma_{NFref}$ of the position of the sample using the calculated reference background $\sigma_{rbg}$ as a reference.

The method is based on an approach different from the art, namely the near-field measurement of a sample in a scattering-type near-field microscope is referenced by calculating the background signal (also termed herein "calculated reference background $\sigma_{rbg}$"), which then allows determining the referenced near-field signal $\sigma_{NFref}$. In other words, according to the method of the invention the near field is removed/suppressed from the measurement to extract the background, whereas other methods typically try to extract the near field by removing the background by some means.

DETAILED DESCRIPTION OF THE INVENTION

Figure 1:
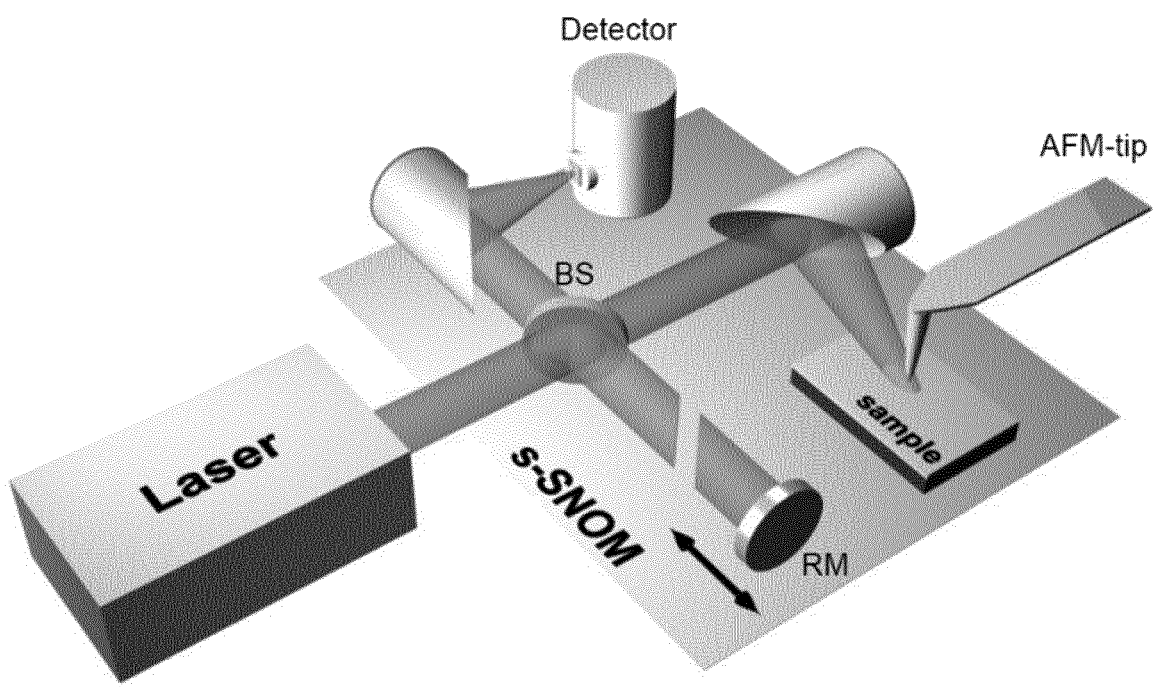
FIG. 1 shows typical schematic setups for interferometric detection in an s-SNOM. The metallic AFM-tip is illuminated with a focused laser beam. The backscattered light is recombined with a reference beam in a Michelson interferometer, comprising a beam-splitter (BS), a reference mirror (RM) and a detector.
Figure 2:
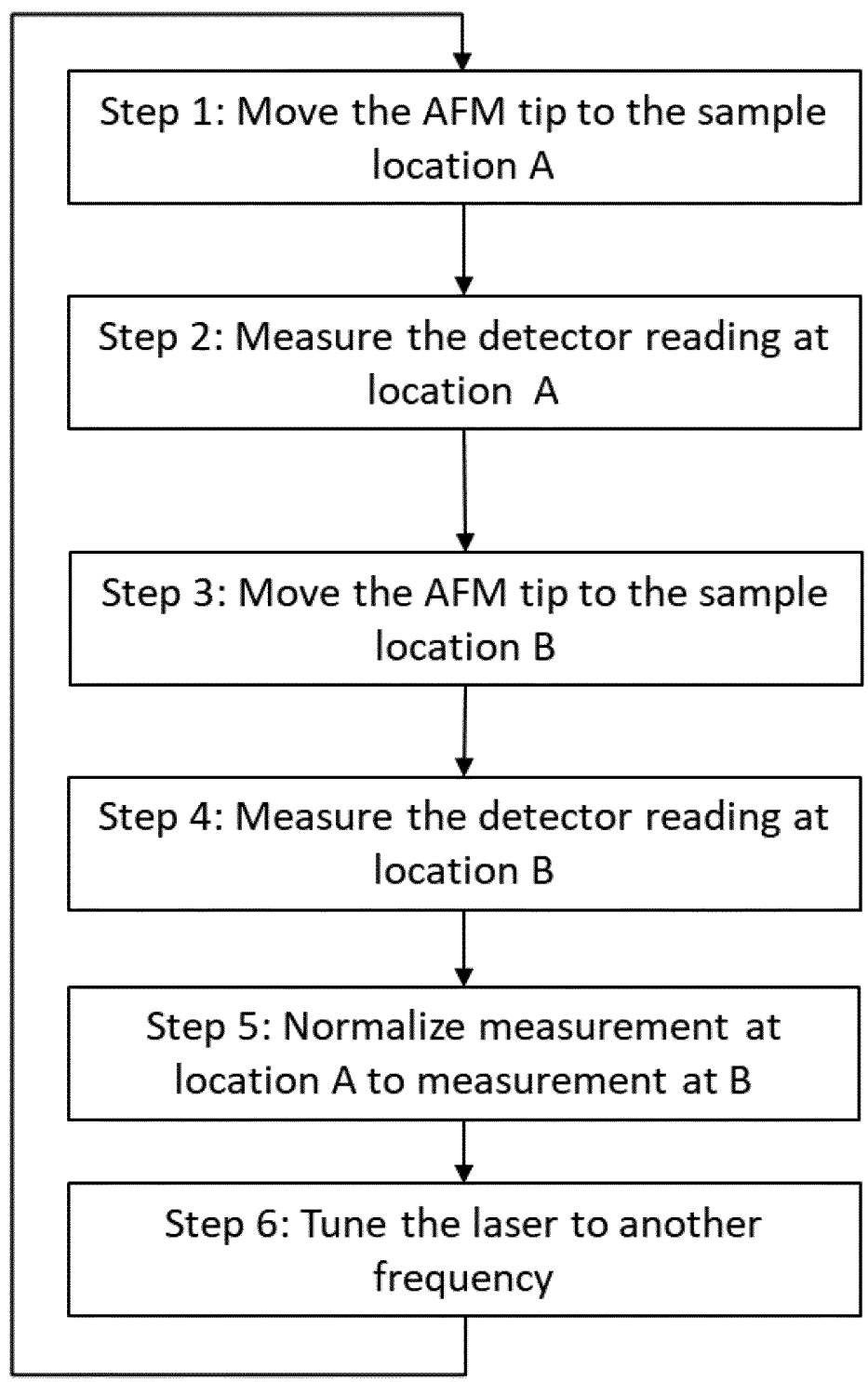
FIG. 2 shows a schematic representation of the measurement procedure utilized in the art for acquiring a point spectrum with wavelength-tunable source. Location B of the sample serves a reference area for the measurements. Steps 1 to 6 have to be repeated multiple (potentially hundreds or even thousands) times in order to acquire a single meaningful spectrum of the sample at location A. Steps 1 and 3 require mechanical repositioning of the tip, which is a slow process that needs to be repeated for each wavelength in the spectrum, thus demanding very long measurement times. In addition, this prevent point spectroscopy on samples that do not have an in situ reference area.
Figure 3:
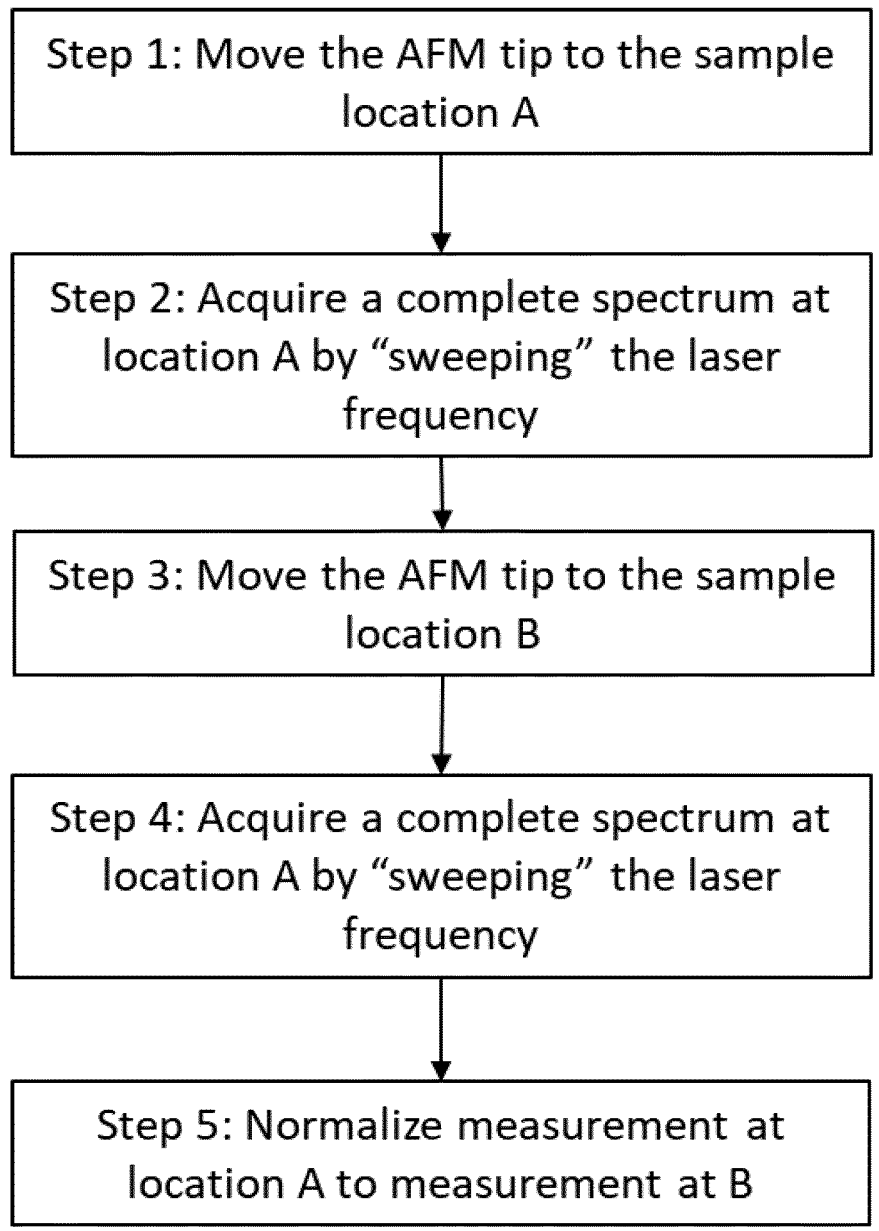
FIG. 3 shows a schematic representation of the measurement procedure enabled by the WLP (white light position) interferometer operation. This procedure requires two measurements at location A and B in order to obtain a point spectrum, i.e. requires moving the tip and requires an additional measurement.

The invention relates to a method for referencing a near-field measurement of a sample in a scattering type near field microscope comprising a probe and a sample, which method comprises the steps a) to e).

The scanning probe microscope used in the methods of the invention comprises an oscillating cantilever probe, a sample and a source of electromagnetic radiation. Suitable systems are known in the art, e.g. from US 2012/0204296 A1, which is included herein by reference.

Step a) comprises providing a modulation of the probe-sample distance $z(t)=z_0-A*\cos(\varphi(t))$ having an offset distance $z_0$, phase $\varphi(t)$, such that $\varphi(t)=0$ corresponds to the smallest probe-sample distance, and a modulation frequency $$\Omega = \frac{d\varphi(t)}{dt}.$$

In general, any oscillating movement could be expressed in the following form:

$$z(t)=z_0-A*\cos(\varphi), \text{ where } \varphi=\varphi(t) \tag{1}$$

where A is the amplitude and φ is the phase of the oscillation. In a preferred embodiment a cantilevered AFM probing tip is oscillating substantially vertically with a frequency Ω, typically Ω is about 5 Hz to about 1000 kHz, preferably 200-300 kHz, as known in homodyne, pseudo heterodyne, nano-FTIR and other setups that utilize the high-harmonic demodulation technique for the background suppression. For such harmonic-oscillations (tapping mode case) one could substitute $\varphi(t)=\Omega t+\phi_0$:

$$z(t)=z_0-A*\cos(\Omega t+\phi_0) \tag{2}$$

where $\phi_0$ is an arbitrary phase offset and $z_0$ is the offset distance.

Preferably, the amplitude of the probe-sample distance z(t) is at least 0.1 nm, preferably at least 10 nm or 100 nm.

Probes to be used in the method according to the present invention are probes comprising a cantilever and a tip, which are known in the art for AFM or for scanning near-field optical microscopy (s-SNOM). These probes typically comprise a cantilever which carries the tip on one of its ends, the other end of the cantilever is typically mounted onto a larger base to simplify mounting and replacement of the probe. The radius of curvature of the tip is typically below about 100 nm, preferably below about 50 nm, most preferably below about 20 nm, however, tips with curvature radii as large as 750 nm are also known and suitable to be used for some s-SNOM applications [Maissen et al, ASC Photonics, 6, 1279 (2019)]. The tips of the cantilevers may be metalized. Suitable probes are commercially available, e.g. from nanoSensors™ or MikroMasch.

In a preferred embodiment cantilevered probes are used. In an alternative embodiment a tuning fork, preferably oscillating vertically or in sheer force mode, could be utilized as probe. In yet another embodiment a hybrid technology where a cantilevered probe is attached to a tuning fork can be used.

In yet another embodiment the AFM probing tip could perform non-harmonic periodic vertical movement, such as jumping, linear or zigzag approach and retraction (as in Peak Force and other non-resonant measurement modes).

In an alternative embodiment, the offset distance $z_0$ is provided with a modulation, i.e. $z_0=z_0(t)$.

In one embodiment, the value of the probe-sample distance $z(t)$ used corresponds to any combination of the following quantities: the voltage applied to an actuator regulating the probe-sample distance, the vertical position Z of the sample or the probe as obtainable from a Z-position sensor, or a value obtained from AFM detection system readout, such as quadrant diode or piezoelectric sensor, or value corresponding to time t if the probe-sample distance $z(t)$ predictably depends on time, e.g. in case of an oscillating probe.

Step b) comprises measuring the scattering signal S of the probe, and determining $\sigma_n$ for different n as the scattering signal S demodulated at frequencies $n*\Omega$, n being an integer equal to or larger than 0, wherein $\sigma_n$ is determined for at least N different frequencies $n*\Lambda$, and N being at least 2. Preferably, N=3, or N≥4, the latter being most preferred.

Step c) comprises calculating a reference background $\sigma_{rbg}$ as a linear combination of $\sigma_n$ according to equation (II)

$$\sigma_{rbg}=\Sigma_n A_n * \sigma_n \tag{II}$$

wherein coefficients $A_n$ of the respective frequencies $n*\Omega$ are to be chosen such that the relative contribution of the scattering signal for $|\phi(t)|<\varepsilon$, wherein $\varepsilon \leq \pi$, to the $\sigma_{rbg}$ is made small over an oscillation cycle, preferably smaller than 10%, even more preferably below 1% and most preferred below 0.1%.

Light scattered from the probing tip when it is in a closest-proximity to the sample surface during its movement contains the information about the optical near-field interaction between the probing tip and the sample and constitutes the near-field contribution to the scattering signal, which is the main object of interest for s-SNOM measurements. Detection of this light allows for achieving the nanoscale spatial resolution about 10-20 nm. Light scattered from the probe when it is at distant segments of the motion trajectory contains mostly scattering from the tip shaft and long-distance probe-sample interaction, which corresponds to the background contributions. Traditionally, this contribution is discarded. The general idea of current invention is to recover this background and to use it to solve the problems known in the art as discussed above.

In a preferred embodiment the background information is collected simultaneously with the near-field contribution, thus allowing for the compensation of even the parasitical physical effects that are changing in time during the course of s-SNOM measurements.

The mathematical basis for the findings of the present invention is discussed in more detail in the following:

As typically described before in the art (Ocelic, 2007), the total tip scattered field $E_{sca}$ consist of $E_{nf}$ that is associated with near-field interaction between the tip and the sample surface and unavoidable background $E_{bg}$ resulting from scattering off the tip shaft or distant sample positions:

$$E_{sca}=E_{nf}+E_{bg} \tag{3}$$

Because the tip oscillates, the scattered field is modulated:

$$E_{sca}=\Sigma_{n=0}^{\infty}(E_{nf,n}+E_{bg,n})\cos(n\phi) \tag{4}$$

For interferometric detection, the detector is also illuminated by the reference field, $E_{ref}$ and the combined power is measured:

$$I_{det}=k_u|E_{sca}+E_{ref}|^2 \tag{5}$$

where $k_u$ is a proportionality constant whose value depends on the illumination power, detector responsivity and the transfer function of the measurements setup.

Substituting Eq. (4) into Eq. (5) and decomposing $I_{det}$ into a Fourier series, equaling the Fourier coefficients of the same order and assuming that $E_{ref}>>E_{bg}$ (the reference field can in principle be made arbitrarily high) gives:

$$u_n=k_u(E_{sca,n}E^*_{ref}+E^*_{sca,n}E_{ref}), \text{for } n>0 \tag{6}$$

It is convenient to rewrite Eq. (6) as $$u_n=k_u s_n s_{ref} \cos(\phi_n-\psi_{ref}), \tag{7}$$

or in complex-valued form:

$$u_n=\text{Re}(U_n)=\text{Re}(k_u s_n s_{ref} s_n e^{i(\phi_n-\psi_{ref})})$$

where $s_n$ and $s_{ref}$ are the amplitudes and $\phi_n$ and $\psi_{ref}$ are the phases of the scattered and reference fields, respectively. Re denotes the real part.

By using one of the techniques known in the art (e.g. Pseudo Heterodyne, Phase shifting, High Speed Holography, nano-FTIR, Quadrature Homodyne, etc.), one can extract both the amplitude $|U_n|=k_u s_n s_{ref}$ and the phase arg $(U_n)=\phi_n-\psi_{ref}$ from the detector readings. To further eliminate $k_u$, $r_{ref}$ and $\psi_{ref}$ a second measurement on a reference material with known optical properties is typically performed in the art followed by the normalization procedure:

$$\eta_n = \frac{U_n}{U_{ref,n}} = \frac{k_u s_n e^{i(\phi_n-\psi_{ref})}}{k_u s_{ref,n} e^{i(\phi_{ref,n}-\psi_{ref})}} = \frac{s_n e^{i\phi_n}}{s_{ref,n} e^{i\phi_{ref,n}}} = \frac{\sigma_n}{\sigma_{ref,n}} \tag{8}$$

where a complex valued scattering coefficient $\sigma_n=s_n \exp(i\phi_n)$ has been defined.

The main purpose of the normalization procedure Eq. (8) is to eliminate the unknown factors, such as the transmissivity of the microscope setup, responsivity of the detector, illumination power, reference beam phase and amplitude. For sufficiently high demodulation order (n≥2) the background contribution $\sigma_{bg,n}$ is much smaller than the near-field contribution $\sigma_{nf,n}$ to $\sigma_n$: $\sigma_{bg,n}<<\sigma_{nf,n}$. Thus, $\eta_n$ measures the local optical properties of the materials:

$$\eta_n = \frac{\sigma_{bg,n}+\sigma_{nf,n}}{\sigma_{ref,n}} \approx \frac{\sigma_{nf,n}}{\sigma_{ref,n}} \tag{9}$$

and is often called in the art as near-field contrast. These contrast could be related to the optical properties of the sample material at different locations on the sample (material contrast), or to the optical properties of the sample material at the same location but different illumination frequencies (spectral contrast).

The normalization procedure according to Eq. (8) utilized in the art requires an additional reference measurement and is susceptible to the physical effects not constant in time, especially for long measurements. In an alternative approach, the normalization to the reference measurement could be replaced by normalization to the demodulated detector signal measured at 0-th harmonic (Craig et al., 2013):

$$\eta_{n,0} = \frac{\sigma_n}{\sigma_0} \quad (10)$$

Such normalization is capable of canceling out the unknown $k_u$, $r_{ref}$ and $\psi_{ref}$, including the physical factors that are not constant in time. It could also eliminate the need for a reference measurement; however, it also decreases the material or the spectral contrast. Indeed, it is known in the art that all demodulation orders, including m=0 contain the near-field (see FIG. 5a). In addition, the exact contribution of near-field can vary from one location to another, thus preventing the quantitative analysis.

The present invention discloses an approach that completely eliminates the necessity for a separate reference measurement, yet is capable of retaining the near-field contrast both in s-SNOM spectra and in s-SNOM images. This is achieved by reconstructing the complex-valued background $\sigma_{bg}$ from the standard s-SNOM detector readings and using this reconstructed background as a reference measurement in the normalization procedure. This is achieved as described in step c) of the method of the invention.

In general, $\sigma_{rbg}$ can be written as:

$$\sigma_{rbg} = \Sigma_n A_n \sigma_n \quad (11)$$

The coefficients $A_n$ need to be chosen in such a way that $\sigma_{rbg}$ contains a minimum to no near-field signal, i.e. pure background without the contribution emanating from the near-field hotspot directly below the tip apex.

To demonstrate how $A_n$ coefficients could be found, Eq. (6) can be first rewritten as:

$$u_n = k_u(E_{nf,n}E^*_{ref} + E^*_{nf,n}E_{ref} + E_{bg,n}E^*_{ref} + E^*_{bg,n}E_{ref}) \quad (12)$$

where star represents the complex conjugation. By multiplying both parts by $A_n$ and summing over all n, one arrives at:

$$\Sigma_n A_n u_n = k_u(\xi_{bg}E^*_{ref} + \xi^*_{bg}E_{ref}) + k_u(\xi_{nf}E^*_{ref} + \xi^*_{nf}E_{ref}) \quad (13)$$

where $$\xi_{bg} = \Sigma_n A_n E_{bg,n} \quad (13a)$$

$$\xi_{nf} = \Sigma_n A_n E_{nf,n} \quad (13b)$$

Coefficients $A_n$ need to be selected in such a way that $|\xi_{bg}|/|\xi_{nf}| \gg 1$. This can be done by considering a portion of the AFM tip trajectory for which $E_{nf} = E_{nf}(\varphi) \ll E_{bg}$. This trajectory corresponds to the oscillation phase $\varphi(t) \notin [-\varepsilon, \varepsilon]$ in Eq. (1), where $\varepsilon$ is a free constraint parameter that defines the near-field region. Using the explicit expressions for the Fourier coefficients $E_{nf,n}$ (note that $E_{nf}(\varphi)$ is a symmetric function over each period):

$$E_{nf,n} = \int_{-\pi}^{+\pi} E_{nf}(\varphi) \cos(n\varphi) d\varphi \quad (14)$$

and applying the Cauchy-Schwarz inequality, the magnitude of $\xi_{nf}$ in Eq. (13b) can be evaluated:

$$|\xi_{nf}| = |\Sigma_n A_n E_{nf,n}| = |\int_{-\pi}^{+\pi} E_{nf}(\varphi) \Sigma_n A_n \cos(n\varphi) d\varphi| \approx |\int_{-\varepsilon}^{+\varepsilon} \varepsilon E_{nf}(\varphi) \Sigma_n A_n \cos(n\varphi) d\varphi| \leq \sqrt{|\int_{-\varepsilon}^{+\varepsilon} E_{nf}^2(\varphi) d\varphi|} \sqrt{|\int_{-\varepsilon}^{+\varepsilon} (\Sigma_n A_n \cos(n\varphi))^2 d\varphi|} = G \sqrt{|\int_{-\varepsilon}^{+\varepsilon} H^2(\varphi) d\varphi|} \quad (15)$$

where G and H are defined as:

$$G = \sqrt{|\int_{-\varepsilon}^{+\varepsilon} E_{nf}^2(\varphi) d\varphi|} \quad (16)$$

and $$H(\varphi) = \Sigma_n A_n \cos(n\varphi) \quad (17)$$

Eq. (15) shows that $H(\varphi)$ acts as a filter function that constraints the upper value of $\xi_{nf}$ by scaling the near-field-related functional G. Therefore, by making $H(\varphi)$ small one can minimize the relative contribution of near field in Eq. (13). Since $H(\varphi)$ doesn't depend on the sample properties or experimental conditions, this minimization can be performed independently from the s-SNOM measurements using standard analytical, semi-analytical or numerical methods.

Thus, preferably, in step c) the contribution of the scattering signal for $|\varphi(t)| < \varepsilon$, wherein $\varepsilon \leq \pi$ to the total scattering signal S over an oscillation cycle is made small by determining the coefficients $A_n$ such that $$r = \sqrt{|\int_{-\varepsilon}^{+\varepsilon} H^2(\varphi) d\varphi|} / \sqrt{|\int_{-\pi}^{+\pi} H^2(\varphi) d\varphi|} < \delta,$$

and $\delta = 0.1$, more preferably $\delta = 0.01$ and most preferably $\delta = 0.001$.

In practice, the detector signal is always measured until some maximum demodulation order M, i.e. $A_n$ are only available for $n = \overline{0, M}$. It is customary to set $A_0 = 0$ in order to exclude constant and slowly varying components of $I_{det}$. Without the loss of generality, the first coefficient $A_1$ could be further set to 1; all the others could be selected to nullify all derivatives of H at $\varphi = 0$ that corresponds to the smallest separation distance between the tip and the sample:

$$\frac{d^p H}{(d\varphi)^p} \bigg|_{\varphi=0} = 0, \, p = \overline{0, 2(M-1)} \quad (18)$$

Thus, in a preferred embodiment, the coefficients $A_n$ are found by nullifying all derivatives of function $H(\varphi)$ up to the order $2(M-1)$ at $\varphi = 0$ It is to be noted that all derivatives of the odd order $2p+1$ are identically null since H is a symmetric function. This way, in order to find $A_n$ that maximize the background-to-nearfield ratio $|\xi_{bg}|/|\xi_{nf}|$ one needs to solve the following linear system of equations:

$$\begin{cases} A_1 = 1 \\ \sum_n n^{2p} A_n = 0, \text{ for } p = \overline{1, M-1} \end{cases} \quad (19)$$

This system is formally determined and can be solved. The solution yields a Taylor series expansion of the function $H(\varphi)$ in the nearest proximity to the sample surface:

$$H(\varphi) = O(\varphi^{2M}), \varphi \in [-\varepsilon, \varepsilon]$$

The functions $H(\varphi)$ corresponding to the solution of Eq. (19) in the region $\varphi \in [-\pi, \pi]$ are plotted in FIG. 6a for different values of M. As can be seen, $H(\varphi)$ are small in a close proximity to sample surface (around the point $\varphi = 0$ in our case), thus filtering out the near-field contribution $\xi_{nf}$.

The efficiency of this filtering is determined by the region where $H(\varphi) \sim 0$ and can be controlled by the expansion order M. The resulting near-field contribution can be estimated using Eq. (15):

$$|\xi_{nf}| < G\sqrt{|\int_{-\varepsilon}^{+\varepsilon} O(\phi^{4m}) d\varphi|} \sim GO(\varepsilon^{2M+0.5}) \quad (20)$$

In a preferred embodiment, the minimization of the function $H(\varphi)$ is performed analytically using Taylor expansion.

Figure 7:
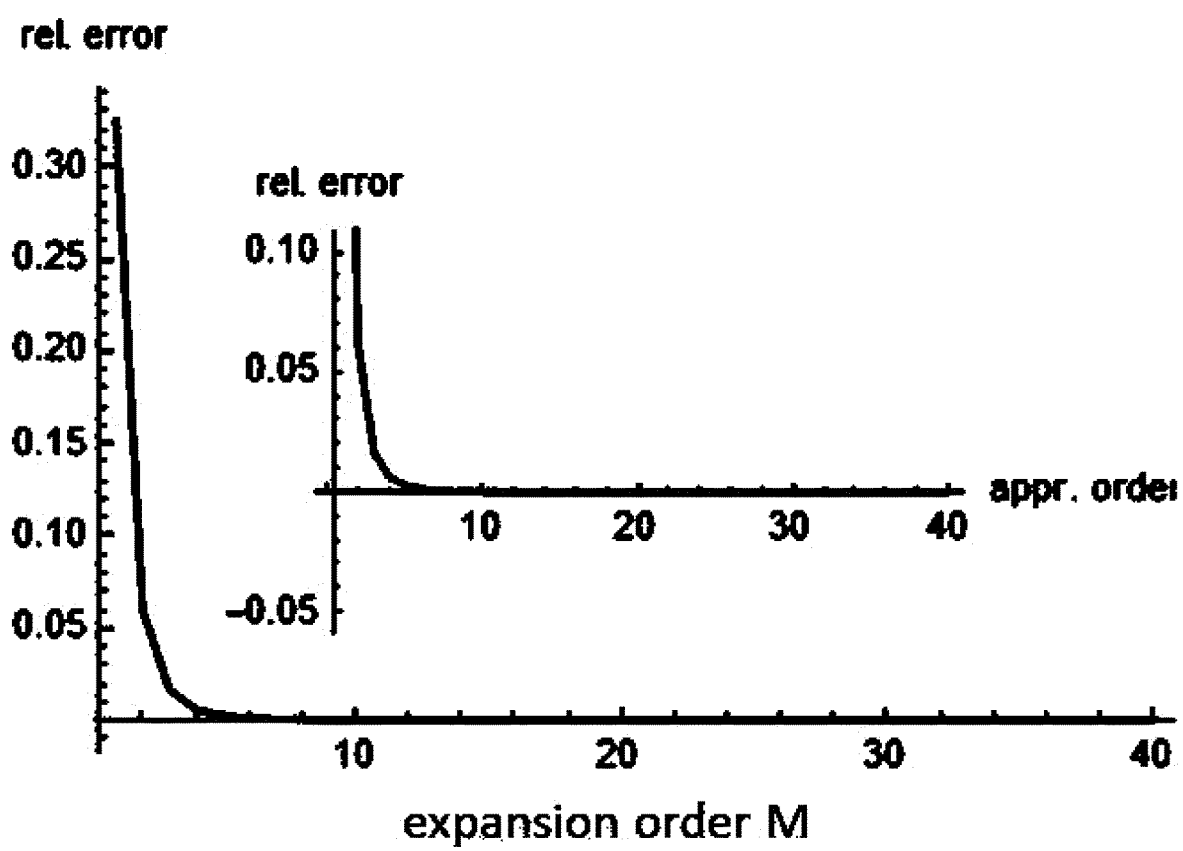
FIG. 7 shows the simulated relative error using a harmonic background model for s-SNOM background (as described in EP2800977) and typical s-SNOM operation with tip radius of about 25 nm and tapping amplitude of about 40 nm.

It can be shown that the minimization of $\xi_{nf}$ maximizes the background to near-field ratio $|\Xi_{bg}|/|\xi_{nf}|$. Indeed, the dominant contribution to $\xi_{bg}$ in Eq. (13a) comes from $E_{bg,1}$. This follows from the fact that for small (compared to the illumination wavelength) tapping amplitudes the background is nearly linear in the tip-sample distance, yielding exponentially small amplitudes for higher-order Fourier coefficients (see FIG. 5b) (Ocelic, 2007). Higher demodulation orders only provide a small correction to $\sigma_{bg}$ that normally does not exceed 10% (see FIG. 7b). It could thus be estimate that:

$$|\xi_{bg}|/|\xi_{nf}| = \Sigma_n A_n E_{bg,n}/|\xi_{nf}| \approx E_{bg,1}/|\xi_{nf}| \quad (21)$$

where we have again assumed that $A_1 = 1$ without the loss of generality.

In another embodiment, minimization of $H(\varphi)$ could performed with $A_0$ set to unity. Direct substitution of the resulting function $H(\varphi)$ into Eq. (18) yields the following system of equations:

$$\begin{cases} \sum_{l=0}^{M} A_l = 1 \\ \sum_{l=0}^{M} l^{2p} A_l = 0, \text{ for } p = \overline{1, M-1} \end{cases} \quad (21a)$$

Figure 6:
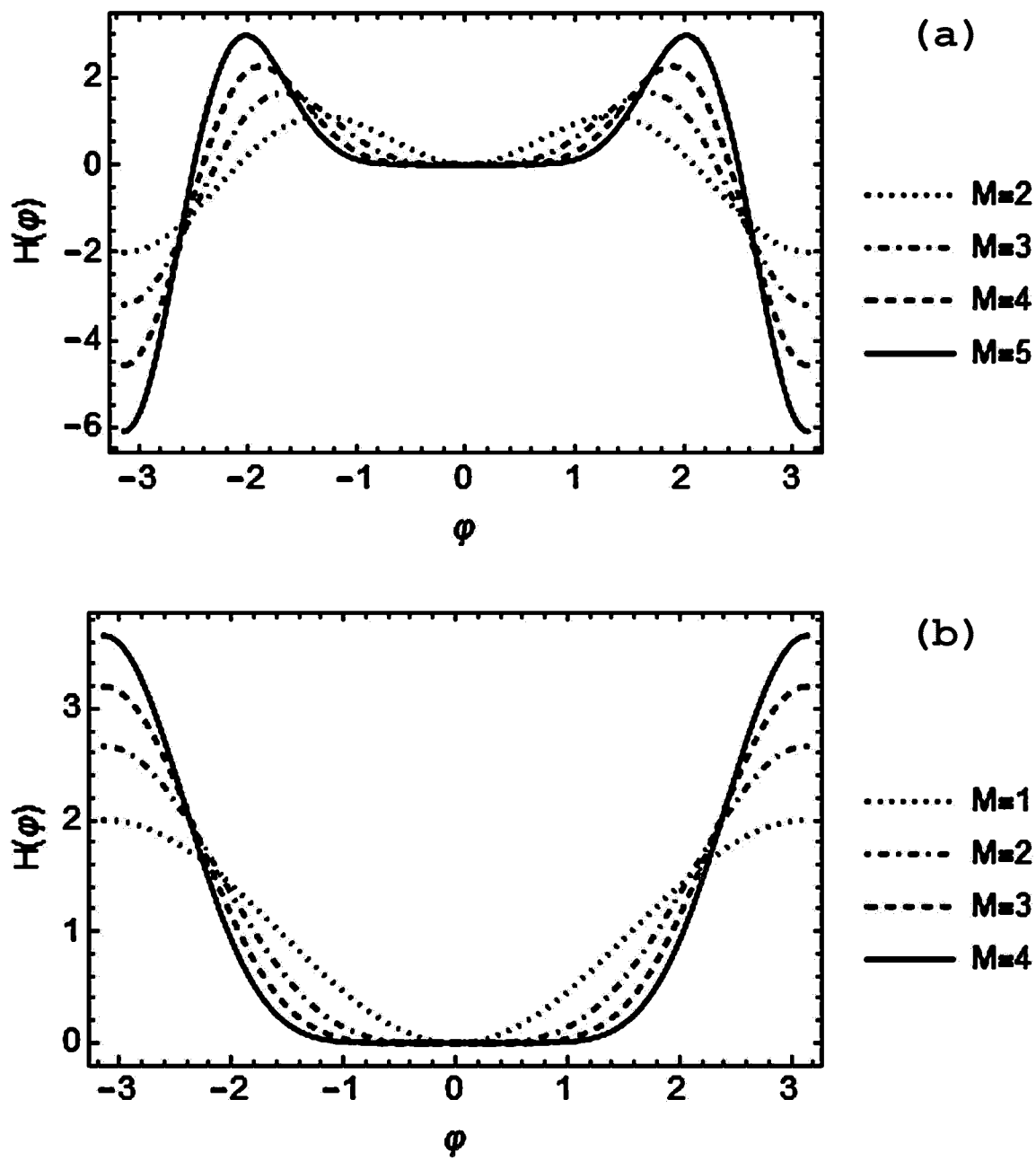
FIG. 6 shows different sets of filtering functions H for different value of M.

This system is also formally determined and yields a set of coefficients $A_l$. The corresponding function $H(\varphi)$ are shown in FIG. 6b.

In an alternative embodiment any arbitrary number of coefficients $A_n$ could be set to zero (for example because the corresponding $\sigma_n$ are unavailable) and the solution for the remaining coefficients is found according to Eq. (18).

The method of the invention further comprises the steps of d) determining the near field signal aw of a position of the sample using at least one harmonic of the modulation frequency $\Omega$ at a frequency $m*\Omega$, m being an integer equal to or larger than 0, and e) determining the referenced near-field signal $\sigma_{NFref}$ of the position of the sample using the calculated reference background $\sigma_{rbg}$ as a reference.

Eq. (21) proves that the higher M is taken—the higher is the background-to-nearfield ratio $|t_{bg}|/|\xi_{nf}|$ in the Eq. (13). Since the $\sigma_n$ are related to $u_n$, it follows that coefficients $A_n$ provide filtering of the near-field contribution from the reconstructed background $\sigma r_{bg}$ defined by Eq. (11). Thus, normalizing s-SNOM measurements to $\sigma_{rbg}$ according to $$\eta_n = \frac{\sigma_n}{\sigma_{rbg}} \quad (22)$$

does not reduce the near-field contrast as much as the normalization according to Eq. (10). This is particularly important, since such normalization preserves to greater extend the relative contrast between materials, assuming that the background stays constant over the area of interest. This allows for putting measurements $\eta_n$ into prospective by comparing them to the measurements, $\eta_n^{ref}$ on some reference material with known optical properties, as typically done in s-SNOM for quantitative analysis:

$$\frac{\eta_n}{\eta_n^{ref}} \approx \frac{\sigma_n}{\sigma_n^{ref}} \quad (23)$$

Figure 4:
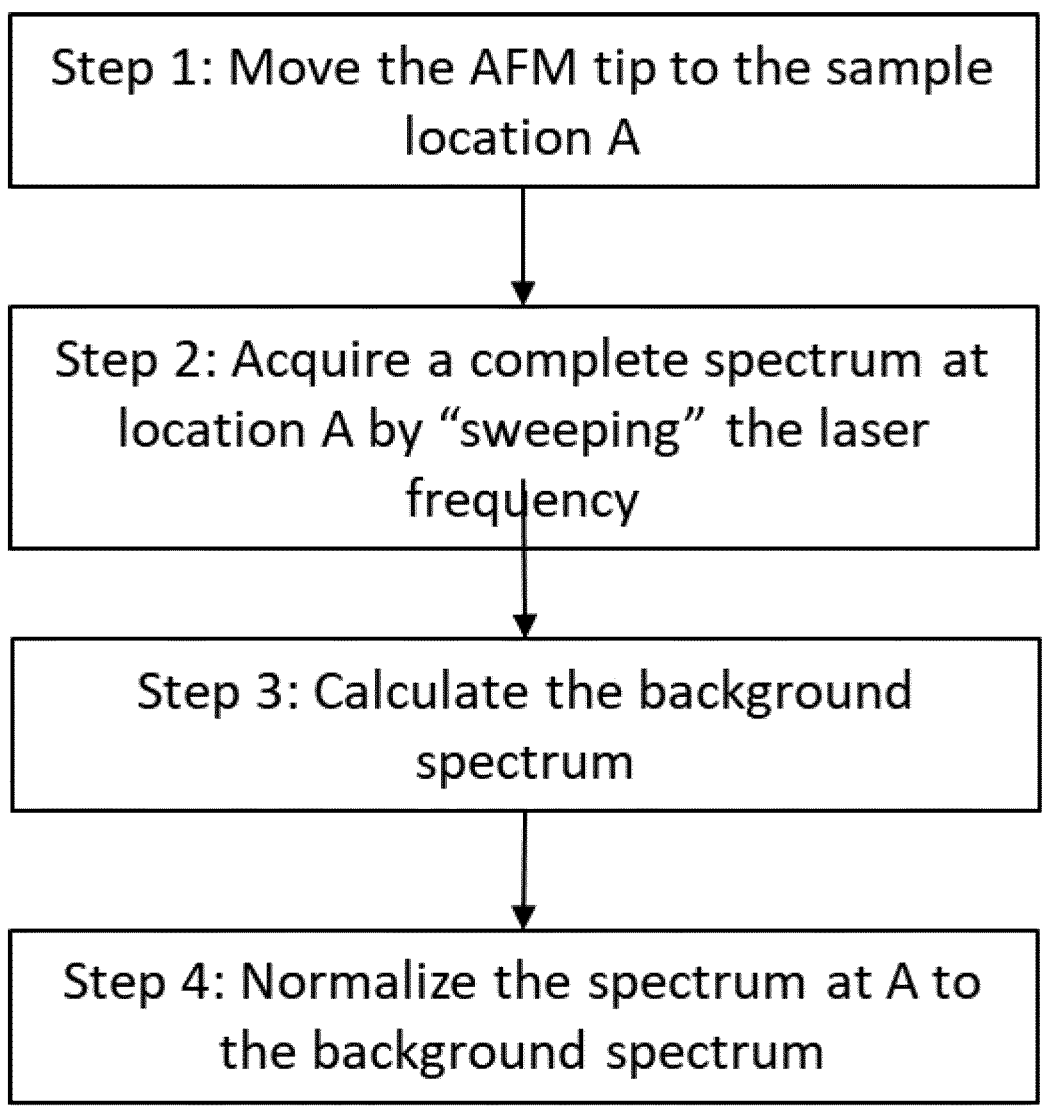
FIG. 4 shows a schematic representation of the measurement procedure according to the present invention. Steps 2 and 3 are done simultaneously and do not require mechanical repositioning of the AFM tip, resulting in a significant reduction of the measurement time. It also enables measuring spectra on samples that have no in situ reference areas.

Since reconstructing the background $\sigma_{rbg}$ does not require additional measurements, it contains the same reference phase and multiplicative factors such as the illumination power and transfer function of the imaging setup as $\sigma_n$. Thus, these factors cancel out upon normalization according to Eq. (22). This includes the unpredictable changes in the reference beam (phase and/or magnitude) upon tuning an illumination source. Thus, the present invention enables a true reference-free point-spectroscopy with wavelength-tunable sources as illustrated in FIG. 4, solving s-SNOM limitations known in the art.

The normalization according to Eq. (22) also eliminates the time-dependent physical effects, related to the interferometer drift and mismatch of the dispersion and absorption in different interferometer arms, including mechanical noise and random fluctuations. Thus, the current invention significantly improves the signal quality and the stability over course of longer measurements.

It is also to be noted that despite describing the invention in the context of oscillating tip motion, the described method also applies for non-periodic tip motion. Indeed, any motion can be viewed as a single cycle of some oscillation described by Eq. (1), and the whole mathematical formalism as developed above still applies. Particular, the disclosed method can still be applied for measurements that record, e.g. a single approach curve without tip tapping, etc.

In an alternative embodiment at least one approach curve is recorded (i.e. scattered signal is sampled as a function of tip-sample distance) followed by the described background reconstruction using the Fourier series representation of the approach curve.

In a preferred embodiment the background is found according to Eq. (11), where the coefficients A, are found by solving Eq. (19). In another embodiment, the coefficients A, are found using Eq. (21a). Yet in another embodiment, the coefficients are found by other analytical, semi-analytical or numerical methods, such as linear and nonlinear regression, least squares or other methods of mathematical optimization with aim of minimizing the near-field contribution in Eq. (13).

In an alternative embodiment the reconstruction of background is obtained by scaling the detector signal $I_{det}$ with some weighting coefficients that are dependent on the instantaneous probe-sample distance. Particularly, the time-gated measurements can be used to collect the near-field-free signal and to use as a reference for the near-field measurements. Since the corresponding near-field interaction is stronger for small probe-sample distances, the higher background-to-nearfield separation ratio could be achieved with a proper choice of weighting coefficients or/and with proper time-gating.

It is to be noted that the normalization according to Eq. (22) can be applied to a single harmonic or several harmonics of the detector signal $\sigma_n$. Moreover, it can be applied to any linear combination $\sigma_{NF}$ of several harmonics:

$$\sigma_{NF} = \Sigma B_n \sigma_n(*)$$

with the same benefit of canceling unknown multiplicative factors and fluctuations in $\sigma_{NF}$.

In preferred embodiments, in step d) the near field signal $\sigma_{NF}$ is determined using any single $\sigma_n$ of step b), and/or in step d) the near field signal $\sigma_{NF}$ is determined using a linear combination $\sigma_{NF}=\Sigma_n B_n^* \sigma_n$. In one embodiment, step d) is conducted before step c).

Preferably, the referenced near-field signal of the sample $\sigma_{NFref}$ is determined for a plurality of probe or sample positions and steps b) to e) are conducted for each sample position for which the near-field $\sigma_{NFref}$ is determined, or wherein steps b) to e) are conducted at least once before, after or during one scan of the sample.

In one preferred embodiment, in step b) the an are determined by interferometric detection, such as Homodyne, Heterodyne, Pseudoheterodyne, Quadrature Homodyne, Self-Homodyne, High Speed holography, Phase Shifting or nano-FTIR, or by non-interferometric detection, or by self-detection technique.

In a preferred embodiment, multiple harmonics n of the detector signal are measured simultaneously.

In one embodiment, the scattering type near field microscope comprises a wavelength tunable light source and steps a) to e) are conducted for a plurality of different illumination wavelengths.

In one preferred embodiment, the scattering type near-field microscope comprises a wavelength tunable light source and an asymmetric interferometer operated in the while light position (WLP), which is known in the art, and in particular as defined in EP3268748 A1. Namely, there is an interferometer integrated in the optical path of the light source, comprising a beam splitter splitting the light of the light source into two optical light paths, the reference light path and the signal light path, wherein the reference light path does not contain the probe, and the signal light path comprises the probe, and the reference and the signal light paths are superimposed at the detector, and the difference of the lengths of the two optical paths can be adjusted to be at most 1000 µm.

Using WLP reduces the changes in phase upon small changes in the illumination wavelength or fluctuations in the relative pathlength between two interferometer arms. In an alternative embodiment, the interferometer is operated outside of the white light position, e.g. the difference of the lengths of the two optical paths can be adjusted to be at least 1000 µm or more.

In a preferred embodiment the quantum cascade laser is utilized as an illumination source. In another embodiment, the optical parametric oscillator is utilized as a source of illumination.

In an alternative embodiment, a free electron laser (FEL) is used as a source of illumination. FEL is known for poor pulse to pulse stability, which makes referencing to another measurement even more problematic. The benefits of this invention are applicable for the utilization of FEL sources in s-SNOM.

The invention is further illustrated by the following Example.

Point spectroscopy was performed on a $SiO_2$ sample using pseudo-heterodyne (PsHet) detection technique as also described in EP 1770714. In PsHet, the position of the reference mirror is modulated harmonically with amplitude γ, yielding a phase modulation of the reference beam. The modulation frequency F is chosen to be much lower than the tip vibration frequency (typically ~300 Hz), so that $E_{ref}=r_R e^{i\psi_{ref}(t)}$ with $\psi_{ref}(t)=\psi_R+\gamma \cos(Ft)$.

Figure 8:
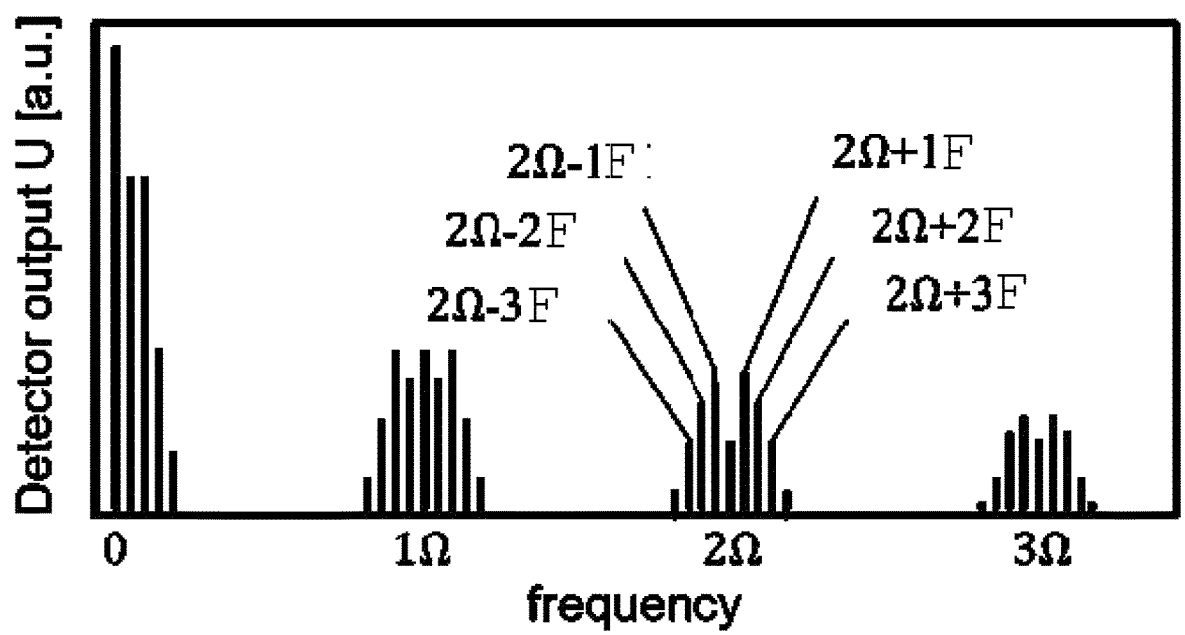
FIG. 8 shows the spectrum of the detector output signal upon the pseudo-heterodyne detection in s-SNOM (adopted from Ocelic, thesis (2007)). The metallic AFM-tip is oscillating with a frequency Ω, and the reference mirror with a frequency F (F<<Ω), causing the interferometric signal to split up in sidebands nΩ±mF.

This modulation leads to the appearance of sidebands in the frequency spectrum of the detector signal, as illustrated in FIG. 8 (adopted from Ocelic 2007). The amplitude of each sideband is given by:

$$u_{n,m} = 2k_u r_R s_n J_m(\gamma)\cos\left(\phi_n - \psi_R - \frac{m\pi}{2}\right) \quad (24)$$

where $J_m$ is the Bessel function of the first kind.

The complex-valued scattering-coefficient $\sigma_n$ can be recovered for example, from the detector-signal sideband amplitudes $u_{n,1}$ and $u_{n,2}$ by setting γ=2.63:

$$\sigma_n = \frac{k_p}{J_1(\gamma)}(u_{n,1} + iu_{n,2}) \quad (25)$$

where $k_p = \frac{\exp(i\psi_R)}{2k_u r_R}$ describes the light source spectral properties and total optical transmissibility of the system, which depend on the reference beam, illumination wavelength, power, etc.

Figure 9:
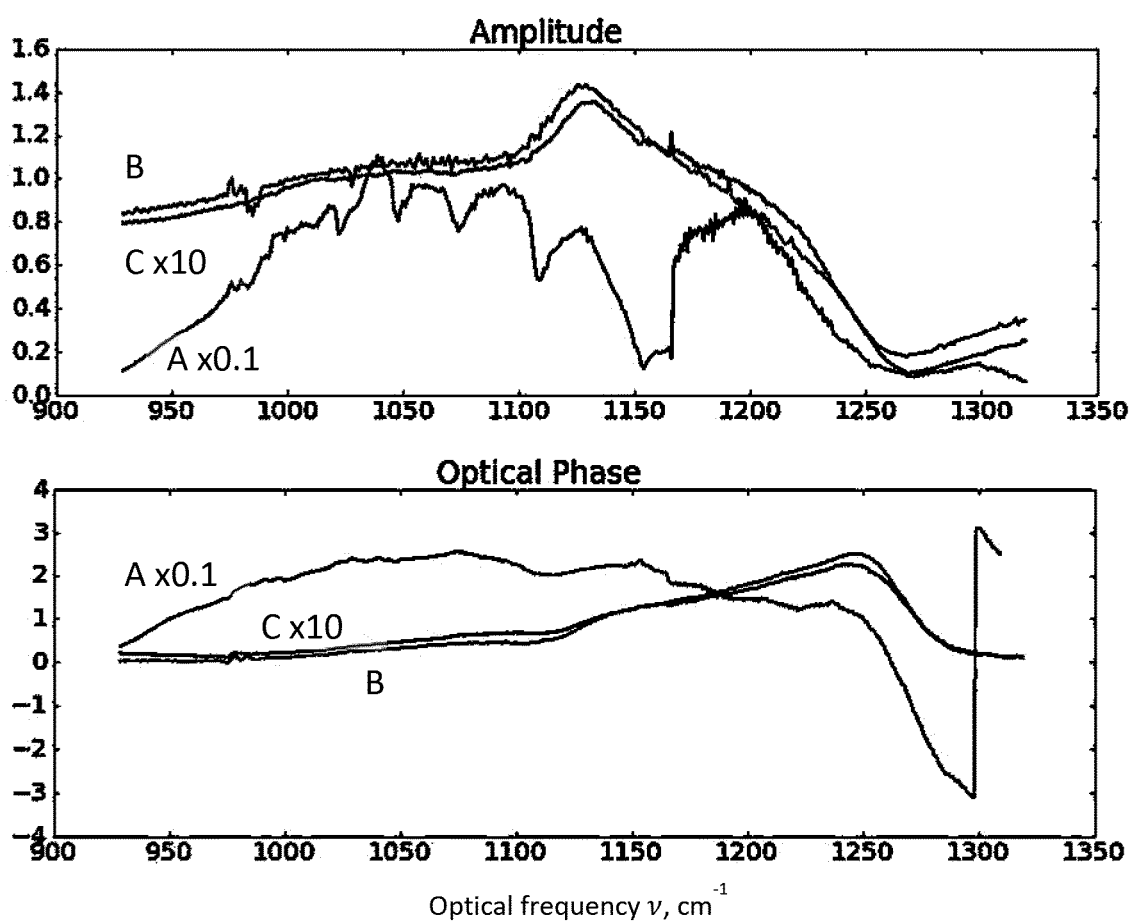
FIG. 9 Graph A: a point-spectrum obtained by pseudo-heterodyne measurement at n=3 without referencing, i.e. $(U_{3,2}+iU_{3,1})$ as a function of illumination frequency. Graph B: Spectrum obtained by normalization to a reference spectrum measured on a reference area (i.e. according to Eq. (9) as typically done in the art). Graph C: the spectrum obtained by normalization to the reconstructed background according to the present invention.

The results of our measurements using a wavelength-tunable IR source (Mircat QCL) are shown in FIG. 9. The spectrum B is obtained by normalizing to a reference measurement performed on a reference area made of Si as typically done in the art and represents the point spectrum of $SiO_2$ as known in the art. The random fluctuations in the light-source spectral properties and setup transmissibility result in a significant spectral noise. In addition, changes in the relative path length of signal and reference interferometer arms could result in an additional wavelength-dependent phase delay, which yields an artificial optical-phase slope and spectral distortions.

In contrast, the spectrum C in FIG. 9 obtained by reconstructing and normalizing to the reconstructed background as described in the present invention shows a significantly lower noise due to intrinsic drift- and fluctuation-compensation. Note, that acquiring this spectrum did not require the presence of an in situ reference area or additional measurements on a reference material, yet perfectly representing the expected spectral signature of $SiO_2$. This demonstrates the main benefits of this invention for nanoscale s-SNOM spectroscopy, such as speed, quality and utility for samples that do not have in-situ reference area.

For comparison, a raw spectrum A recorded on $SiO_2$ without any normalization is also shown in FIG. 9. The spectral shape does not correspond to that of $SiO_2$. In addition, an unphysical jump in phase (around 1300 cm$^{-1}$) is apparent despite operating the interferometer in the white light position, which illustrates that raw, not normalized spectra are completely unsuitable for material analysis.

Figure 10:
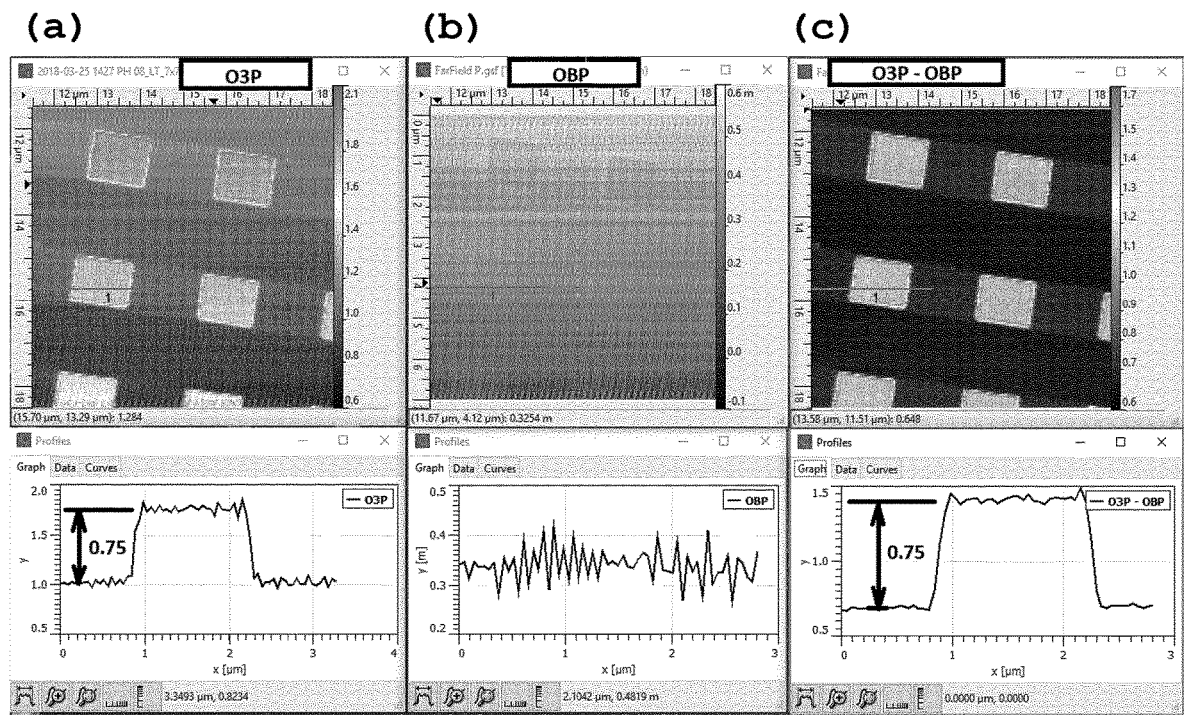
FIG. 10 (a) shows a phase image measured on a TGQ1 AFM calibration sample, showing a pronounced near-field contrast between Si and $SiO_2$. (b) shows the image of the reconstructed background according to the present invention. It is to be noted that the near-field contrast observed in panel a) is nearly completely suppressed. (c) shows an image obtained by the normalization procedure of Eq. 22 of the present invention. The quality of the image is significantly improved while retaining the same near-field contrast as in the original image in panel (a).

Another example presented in FIG. 10 shows measurements performed on a TGQ-1 AFM calibration sample using the same PsHet technique. Panel a) presents a phase image, which shows a strong near-field contrast between the $SiO_2$ squares and the Si substrate of about 0.75 obtained at the 3$^{rd}$ demodulation order and related to the differences in the optical properties of the two materials. The image has a relatively high noise and some slow variation of contrast from top to bottom due to some uncompensated interferometer drift. The reconstructed background presented in panel b) shows almost no material contrast, but contains the interferometer drift and noise observed in the near-field image of panel a). Normalization to this reconstructed background according to the procedure outlined in the present invention returns an image (see panel c) with a significantly enhanced signal to noise and no observable drift. Most importantly, it retains the same material contrast of 0.75 as in the original near-field image (panel a), demonstrating the usability of the method of the invention for quantitative analysis.

Elimination of the Indirect Illumination

Figure 11:
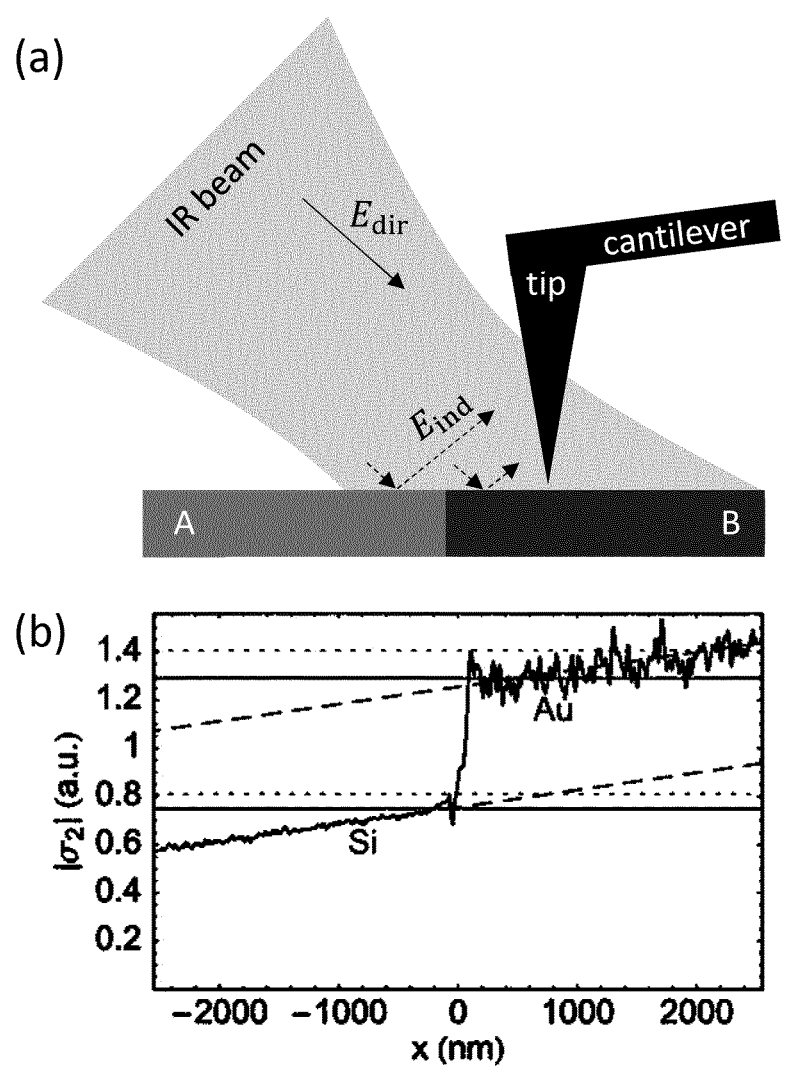
FIG. 11 (a) shows an illustration of the origin of indirect illumination. (b) shows the effect of indirect illumination to the near-field signal observed in the long range scan across a Si—Au interface (adopted from [Ocelic thesis 2007]).

The incident electric field $E_{in}$ illuminating the AFM probing tip can be decomposed into a direct $E_{dir}$ and an indirect $E_{ind}$ parts (see FIG. 11a). The direct part originates from the focused beam directly and independent from the sample. The indirect part originates from the reflection and scattering from the sample surface away from the AFM tip and depends on the optical sample properties at a distant part of the sample. Thus, the illuminating field also depends on the sample properties in a certain distance around the tip, which in turn affects the near-field hotspot probing the sample and results in the modulation of the near-field signal depending on the sample properties outside of the near-field region. This effect is generally termed "indirect illumination". It can be illustrated by considering an interface between two materials A and B (FIG. 11a). When the tip is scanned across the interface from left to right, the contribution of reflection from material A decreases, while the contribution from material B increases. This leads to a slowly changing slope in the scattering signal over distances comparable to the illumination wavelength (dashed lines in FIG. 11b).

The indirect illumination results in a nonlocal multiplicative factor in the near-field signal:

$$\sigma_n = (1+R)^2 s_n \exp(i\phi_n) \tag{26}$$

where R describes the relative strength of the reflection compared to the direct illumination. Since this prefactor can vary from one sample location to another—it is not completely cancelled out by the typical normalization according to Eq. 9 utilized in the art. However, this prefactor is constant for all demodulation harmonics, provided that they are measured simultaneously. Therefore, the indirect illumination is also contained in the reconstructed background, i.e. $\sigma_{rbg} \propto (1+R)^2$ and is cancelled out by the normalization to $\sigma_{rbg}$ according to Eq. (22). That is, this invention solves another major problem of s-SNOM known in the art.

In a preferred embodiment, a pseudoheterodyne detection is employed. In another embodiment, high-speed holography as known in the art is employed. In yet another preferred embodiment, phase shifting technique as known in the art is utilized. In an alternative embodiment the quadrature homodyne detection is utilized or any other amplitude- and/or phase-resolved technique that returns harmonics of the demodulated detector signal as known in the art.

Application for Nano-FTIR and Broadband Sources.

In nano-FTIR measurements a broadband light source is used, whose spectral properties could be described by a complex-valued spectral density S(k), where $k=2\pi/\lambda$ is the free-space wavenumber. The detector measures the total power $I_{det}$, which is the spectral power at the detector, $S_{det}$, integrated over the whole source spectrum:

$$I_n = \int_0^{+\infty} |S_{det}(k)|^2 dk:$$

$$I_n \propto \int_0^{+\infty} \{S_{sca,n} S_{ref}^* + S_{sca,n}^* S_{ref}\} dk, \text{for } n>0 \tag{27}$$

where $S_{sca,n}$ and $S_{ref}$ are the spectral densities of the total scattered field and the reference, respectively. As before, the reference being much stronger than the scattering is assumed.

For the nano-FTIR detection, the length of the reference beam is varied linearly by translating the reference mirror and the detector power is recorded as a function of the mirror position. This mirror translation yields a linear shift of the reference beam phase. Thus, $S_{ref}(k) = s_{ref}(k) e^{ikx}$, where x is the pathlength accumulated due to the mirror translation. The mirror translation is done in such a way that the reference phase variations are much slower than the probe-oscillating frequency, i.e.

$$k \frac{dx}{dt} \ll \Omega, \forall k: s_{ref}(k) \neq 0.$$

By writing Eq. (27) in the complex form we can obtain:

$$I_n(x) = \int_{-\infty}^{+\infty} \beta(k) \sigma_n(k) e^{ikx} dk \tag{28}$$

where $\beta(k)$ is the complex-valued responsivity function that describes the light-source spectral properties and the total optical transmissibility of the system, which are typically not known. The $\sigma_n = S_{sca,n}/S_{in}$ is the complex-valued scattering coefficient ($S_{in}$ is the spectral power incident upon the tip). This scattering coefficient is the sum of the near-field and background scattering coefficients, $\sigma_n = \sigma_{nf,n} + \sigma_{bg,n}$ and can be found using the Fourier transform of Eq. (28):

$$\sigma_n(k) = \frac{\mathcal{F}[I_{det,n}](k)}{\beta(k)} \tag{29}$$

where $\mathcal{F}[I_{det,n}](k)$ denotes the Fourier transform of the detector signal $I_{det,n}(x)$. As known in the art in nano-FTIR spectroscopy the unknown function $\beta(k)$ can be removed by normalizing $\sigma_n(k)$ to that obtained from a reference measurement performed on an area with known optical properties, yielding the nano-FTIR spectrum of the sample material. For sufficiently high demodulation harmonic the background is fully suppressed and the normalization according to Eq. (9) yields:

$$\eta(k) = \frac{\sigma_{nf,n}(k)}{\sigma_{ref,n}(k)} \tag{30}$$

As was described before and as it is known in the art, the drawback of this normalization is the necessity of making an additional reference measurement (which sometimes even requires changing the sample) and the susceptibility to various parasitic physical effects as discussed in the art.

The method of the present invention allows avoiding the necessity of the independent reference measurement. Instead, a background spectrum can be recovered for each spectral component k:

$$\sigma_{rbg}(k) = \Sigma_n A_n \sigma_n(k) \tag{31}$$

and used for the normalization of $\sigma_n(k)$ according to Eq. (22):

$$\eta(k) = \frac{\sigma_n(k)}{\sigma_{rbg}(k)} \tag{32}$$

The coefficients $A_n$ are once again found to ensure the best suppression of the near-field contribution possible with the available data.

The benefit of the using the reconstructed background as a reference in nano-FTIR measurements is that it intrinsically includes all the noise and power fluctuations happening over the course of measurements of $I_n(x)$ on both slow and fast time scales compared to the sampling rate, thus allowing for its suppression and elimination. In addition, the normalization according to Eq. (32) compensates the "indirect illumination" effects related to the spectral variation of the far-field reflection from the sample surface. For example, when a sample comprises a film with thickness on a micrometer scale, illumination by IR light leads to periodic oscillations in the far-field reflection spectrum due to Fabry-Perot resonances in the film that illuminates the tip. These oscillations are transferred to an through the multiplicative prefactor $(1+R)^2$ in the Eq. (26), which in turn cancels out upon the normalization to $\sigma_{rbg}$.

In a preferred embodiment a nano-FTIR detection principle is utilized, where the AFM probing tip together with the sample is placed into one arm of an (asymmetric) interferometer and the detector signal is recorded as a function of reference mirror position.

In an alternative embodiment, a symmetric interferometer with the sample located outside of the interferometer is utilized.

In a preferred embodiment, the reference mirror is translated linearly and the Fourier transformation is applied to the recorded detector signal to obtain spectra.

In an alternative embodiment, the reference path length x is modulated harmonically or non-harmonically and the appropriate transformation is applied to obtain the spectrum $\sigma_n(k)$.

In an alternative embodiment the time domain spectroscopy (TDS) is used for detection.

In yet another embodiment the electrooptical sampling (Eisele et al., 2014) or all electronic detection (Liewald et al., 2018) is utilized for the detection of the scattered field.

In a preferred embodiment a broadband, preferably supercontinuum, laser source is utilized. In another preferred embodiment a synchrotron radiation is used as an illumination source. In yet another embodiment a thermal source, such as glowbar or plasma or laser driven plasma is utilized. In yet another embodiment the radiation from a photoconductive antenna is utilized.

Application to Self-Detection

The method was illustrated above using s-SNOM setups that have a dedicated detector for recording the tip-scattered light. The same principles, however, can be applied for set-ups that utilize the laser source as a detector itself—so called self-detection s-SNOM (see Giordano et al., 2018). In self-detection s-SNOM setups the laser cavity and the external cavity formed between the laser source and the tip-sample system act as an interferometer that controls the interference pattern in the laser gain medium depending on the length of the external cavity (controlled by a delay stage). In turn, the interference pattern varies the voltage across the gain medium, which serves as the detector. When used with the high-harmonic demodulation technique, the result of the measurements are the demodulation harmonics which can be used to reconstruct the background and further apply the method of this invention described in the context of the interferometric s-SNOM. Importantly, the method applies to both amplitude measurements and amplitude- and phase-resolved measurements, which can be obtained by combining self-detection with e.g. PsHet or high speed holography principles for extracting amplitude and phase of the backscattered signal.

In a preferred embodiment, a quantum cascade laser is used as the illumination (and detection) source.

In a preferred embodiment, the length of the external cavity is changed linearly, harmonically or non-harmonically with the corresponding mathematical transformation/filtering to obtain amplitude and phase of the scattered signal.

Application to Non-Interferometric Techniques

Reconstructing the background from the demodulation harmonics as described above for interferometric s-SNOM could be also beneficial for non-interferometric detection s-SNOM schemes, as demonstrated below. In non-interferometric measurements the detector records the scattering power without reference:

$$I_{det} \propto |E_{sca}|^2 = |E_{nf} + E_{bg}|^2 \qquad (33)$$

Figure 5:
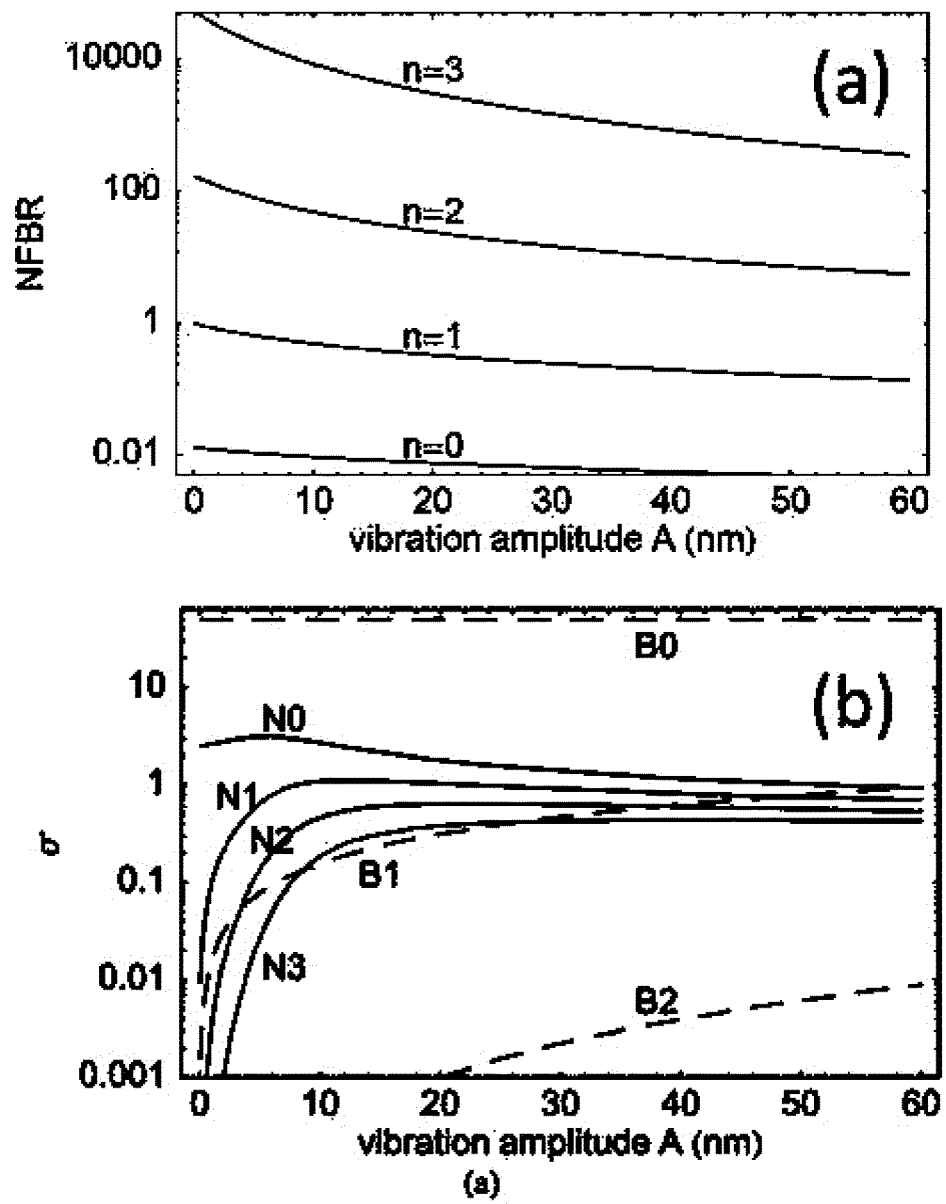
FIG. 5 shows (a) The near field to background ratio $|E_{nf,n}|/|E_{bg,n}|$ typical for near-field measurements. (b) The background $|E_{bg,n}|$. Adopted from Ocelic, thesis 2007.

It can be shown, for n>0

$$u_n \propto (E_{nf,n} E^*_{bg,0} + E^*_{nf,n} E_{bg,0}) \qquad (34)$$

where we have only retained the strongest background contribution arising from $E_{bg,0}$ (see FIG. 5a).

This expression is completely analogous to Eq. (6) and can also be rewritten as:

$$u_n = k_u s_n b_0 \cos(\phi_n - \psi_0) \qquad (35)$$

where $b_0$ and $\psi_0$ stand for the amplitude and phase of the background demodulated at the $0^{th}$ harmonic, i.e. $\sigma_{bg,0} = b_0 \exp(i\psi_0)$.

Assuming that the ratio between the amplitude of the $0^{th}$ harmonic and the $1^{st}$ harmonic of the background stays constant for different measurements, the reconstructed background $\sigma_{bg}$ is indicative of $\sigma_{bg,0}$ (see Eq. (21)) and the normalization according to Eq. (22) would return $\eta_n$ such that $|\eta_n| \propto s_n$, i.e. measures the amplitude of the near-field. It is to be noted that all benefits described in the context of interferometric s-SNOM are also valid, such as the elimination of time-dependent and time-independent parasitic effects.

Extraction of Near Field from Lower Demodulation Orders

As described in the art, the demodulated signal in lower harmonics is contaminated by the additive background. Since the background is generally unknown, these harmonics (n<2) are usually not utilized for the sample analysis in s-SNOM despite having stronger near-field signal (see FIG. 5b), thus providing better signal to noise ratio. The ability to reconstruct the background provides means for eliminating or suppressing the additive background in lower harmonics, thus enabling their utilization for near-field analysis. This could be done, for example, by recalling that the reconstructed background is dominated by the $E_{rbg,1}$ (see Eq. (21)) and simply subtracting it from the total signal demodulated at the $1^{st}$ harmonic. Such subtraction eliminates (in the first order approximation) the additive background contribution, while the subsequent normalization according to Eq. (22) eliminates multiplicative constants, such as transfer function and parasitic effects, bringing the full benefit of the invention discussed before combined with the best signal to noise offered by lower harmonics.

In a preferred embodiment, evaluation is performed comprising the following 3 steps. At step 1 the reconstructed background is calculated according to step c) of the present invention. At step 2, the reconstructed background is subtracted from the optical signal measured at the first demodulation harmonic. At step 3, the result of step 2 is normalized to the reconstructed background. In an alternative embodiment, the reconstructed background is used to obtain the vertical dependence of the background signal on tip height.

Subsequent simulated demodulation returns a more accurate representation of the $E_{rbg,1}$, which is then subtracted from $E_1$ to obtain the near-field contribution $E_{nf,1}$. Subsequent normalization according to Eq. (22) eliminates the remaining multiplicative constants.

Types of Illumination Sources

In the preferred embodiment the illumination source is a source of infrared (IR) radiation. In an alternative embodiment, the illumination is provided by an X-Ray, UV, Visible, Near-Infrared, THz or sub-THz light source. In a preferred embodiment the sources is a tunable single wavelength source. In an alternative embodiment, the source is a broadband source. The inventions applies to continuous-wave (CW) and pulsed light sources.

In one embodiment the power of the electromagnetic radiation source is harmonically modulated.

Preferably, the measurements of the dielectric properties of the sample with the method of the invention are performed for a plurality of spatial positions on the sample and/or for a plurality of wavelengths of the electromagnetic radiation.

REFERENCES

Craig, I. M., Taubman, M. S., Lea, A. S., Phillips, M. C., Josberger, E. E., & Raschke, M. B. (2013). Infrared near-field spectroscopy of trace explosives using an external cavity quantum cascade laser. *Optics Express*, 21(25), 30401. https://doi.org/10.1364/OE.21.030401

Deutsch, B., Hillenbrand, R., & Novotny, L. (2008). Near-field amplitude and phase recovery using phase-shifting interferometry. *Optics Express*, 16(2), 494-501. https://doi.org/10.1364/OE.16.000494

Eisele, M., Cocker, T. L., Huber, M. A., Plankl, M., Viti, L., Ercolani, D., Sorba, L. Vitiello, M. S., Huber, R. (2014). Ultrafast multi-terahertz nano-spectroscopy with sub-cycle temporal resolution. *Nature Photonics*, 8(October), 841-845. https://doi.org/10.1038/nphoton.2014.225

Giordano, M. C., Mastel, S., Liewald, C., Columbo, L. L., Brambilla, M., Viti, L., Politano, A., Zhang, K., Li, L., Davies, A. G., Linfield, E. H. Hillenbrand, R. Keilmann, F. Scamarcio, G., Vitiello, M. S. (2018). Phase-resolved terahertz self-detection near-field microscopy. *Optics Express*, 26(14), 18423. https://doi.org/10.1364/OE.26.018423

Huth, F., Govyadinov, A., Amarie, S., Nuansing, W., Keilmann, F., & Hillenbrand, R. (2012). Nano-FTIR absorption spectroscopy of molecular fingerprints at 20 nm spatial resolution. *Nano Letters*, 12(8), 3973-3978. https://doi.org/10.1021/nl301159v Liewald, C., Mastel, S., Hesler, J., Huber, A. J., Hillenbrand, R., & Keilmann, F. (2018). All-electronic terahertz nanoscopy. *Optica*, 5(2), 159. https://doi.org/10.1364/optica.5.000159

Ocelic, N. (2007). *Quantitative Near-field Phonon-polariton Spectroscopy*. Technische Universität München.

Ocelic, N., Huber, A. J., & Hillenbrand, R. (2006). Pseudoheterodyne detection for background-free near-field spectroscopy. *Applied Physics Letters*, 89(10), 1-4. https://doi.org/10.1063/1.2348781

Taubner, T., Hillenbrand, R., & Keilmann, F. (2003). Performance of visible and mid-infrared scattering-type near-field optical microscopes. *Journal of Microscopy*, 210(Pt 3), 311-314. https://doi.org/10.1046/j.1365-2818.2003.01164.x Yoxall, E., Schnell, M., Mastel, S., & Hillenbrand, R. (2015). Magnitude and phase-resolved infrared vibrational nanospectroscopy with a swept quantum cascade laser. *Optics Express*, 23(10), 13358. https://doi.org/10.1364/OE.23.013358

The invention claimed is:

1. Method for referencing a near-field measurement of a sample in a scattering type near field microscope comprising a probe and a sample, which method comprises the steps of
   a) providing a modulation of the probe-sample distance $z(t)=z_0-A\cdot\cos(\varphi(t))$ having an offset distance $z_0$, phase $\varphi(t)$, such that $\varphi(t)=0$ corresponds to the smallest probe-sample distance, and at a modulation frequency $$\Omega = \frac{d\varphi(t)}{dt};$$

b) measuring the scattering signal S of the probe, and determining $\sigma_n$ for different n as the scattering signal S demodulated at frequencies $n*\Omega n$, n being an integer equal to or larger than 0, wherein $\sigma_n$ is determined for at least M different frequencies $n*\Omega$, and M being at least 2;
   c) calculating a reference background $\sigma_{rbg}$ as a linear combination of $\sigma_n$ according to equation (II)

$$\sigma_{rbg}=\Sigma_n A_n \cdot \sigma_n \quad (II)$$

wherein coefficients $A_n$ of the respective frequencies $n*\Omega$ are to be chosen such that the relative contribution of the scattering signal for $|\varphi(t)|<\varepsilon$, wherein $\varepsilon\leq\pi$, to the $\sigma_{rbg}$ is made small over an oscillation cycle;
   d) determining the near field signal $\sigma_{NF}$ of a position of the sample using at least one harmonic of the modulation frequency $\Omega$ at a frequency $m*\Omega$, m being an integer equal to or larger than 0, and
   e) determining the referenced near-field signal $\sigma_{NFref}$ of the position of the sample using the calculated reference background $\sigma_{rbg}$ as a reference.

2. The method according to claim 1, wherein in step e) the amplitude and/or the phase of the near field signal $\sigma_{NFref}$ is determined using the calculated reference background $\sigma_{bg}$ as an amplitude and/or phase reference.

3. The method according to claim 1, wherein in step c) the contribution of the scattering signal for $|\varphi(t)|<\varepsilon$, wherein $\varepsilon\leq\pi$ to the total scattering signal S over an oscillation cycle ($|\varphi(t)|\leq\pi$) is made small by determining the coefficients $A_n$ such that $$r=\sqrt{|\int_{-\varepsilon}^{+\varepsilon}H^2(\varphi)d\varphi|/|\int_{-\pi}^{+\pi}H^2(\varphi)d\varphi|}<\delta,$$

wherein $$H(\varphi)=\Sigma_n A_n \cos(n\varphi) \quad (II)$$

and $\delta=0.1$, preferably $\delta=0.01$ and most preferably $\delta=0.001$.

4. The method according to claim 3, wherein the coefficients $A_n$ are found by nullifying all derivatives of function $H(\varphi)$ up to the order $$\overline{2(M-1)} \text{ at } \varphi = 0 \left(\text{i.e. } \frac{d^p H}{d\varphi^p}\bigg|_{\varphi=0} = 0, p = \overline{0, 2(M-1)}\right).$$

5. The method according to claim 1, wherein M=3, or M≥4.

6. The method according to claim 1, wherein in step d) the near field signal $\sigma_{NF}$ is determined using any single $\sigma_n$ of step b).

7. The method according to claim 1, wherein in step d) the near field signal $\sigma_{NF}$ is determined using a linear combination $\sigma_{NF}=\Sigma_n B_n^* \sigma_n$.

8. The method according to claim 1, wherein step d) is conducted before step c).

9. The method according to claim 1, wherein the offset distance $z_g$ is provided a modulation, i.e. $z_g=z_g(t)$.

10. The method according to claim 1, wherein the value of the probe-sample distance z(t) used corresponds to any combination of the following quantities: the voltage applied to an actuator regulating the probe-sample distance, the vertical position Z of the sample or the probe as obtainable from a Z-position sensor, or a value obtained from AFM detection system readout, such as quadrant diode or piezoelectric sensor, or value corresponding to time t if the probe-sample distance z(t) predictably depends on time, e.g. in case of an oscillating probe.

11. The method according to claim 1, wherein the amplitude of the probe-sample distance z(t) is at least 0.1 nm, preferably at least 10 nm or 100 nm.

12. The method according to claim 1, wherein the referenced near-field signal of the sample $\sigma_{NFref}$ is determined for a plurality of probe or sample positions and steps b) to e) are conducted for each sample position for which the near-field $\sigma_{NFref}$ is determined, or wherein steps b) to e) are conducted at least once before, after or during one scan of the sample.

13. The method according to claim 1, wherein the scattering type near field microscope comprises a wavelength tunable light source and steps a) to e) of claim 1 are conducted for a plurality of different illumination wavelengths.

14. The method according to claim 1, wherein in step b) the $\sigma_n$ are determined by interferometric detection, such as Homodyne, Heterodyne, Pseudoheterodyne, Quadrature Homodyne, Self-Homodyne, High Speed holography, Phase Shifting or nano-FTIR, or by non-interferometric detection, or by self-detection technique.

15. The method according to claim 1, wherein the scattering type near field microscope comprises a wavelength tunable light source and an asymmetric interferometer operated in the while light position.

16. The method according to claim 1, wherein in step d) the near-field signal $\sigma_{NF}$ is determined using at least one background contaminated $\sigma_m$, wherein preferably m<2, and the reference background $\sigma_{rbg}$.

* * * * *